July 7, 1925. 1,545,331
R. KAAPKE ET AL
POTATO DIGGER
Filed Nov. 27, 1922 2 Sheets-Sheet 1
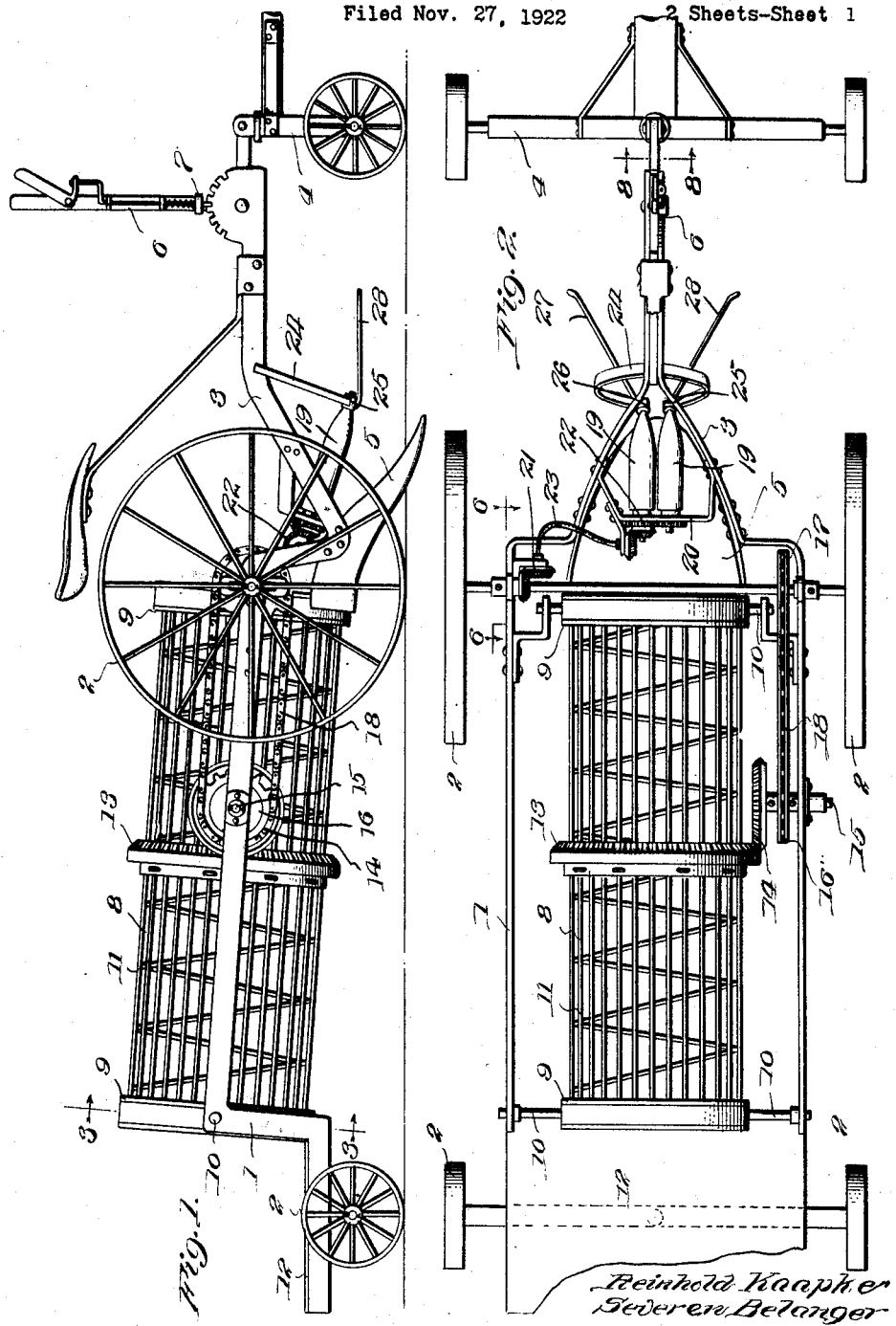

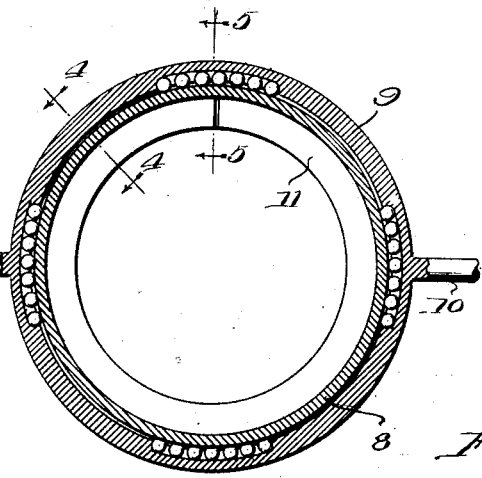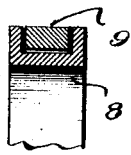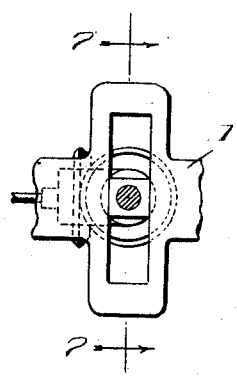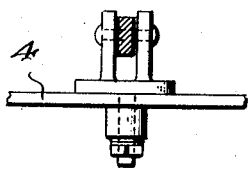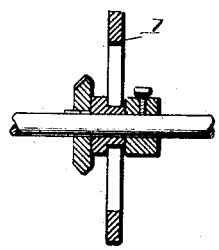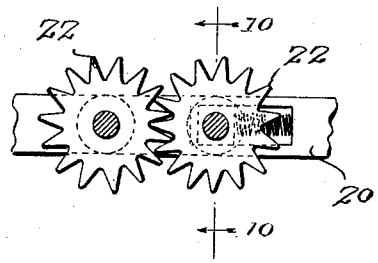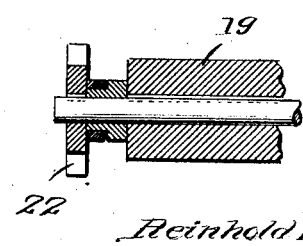

Patented July 7, 1925.

1,545,331

UNITED STATES PATENT OFFICE.

REINHOLD KAAPKE AND SEVEREN BELANGER, OF PROVEMONT, MICHIGAN.

POTATO DIGGER.

Application filed November 27, 1922. Serial No. 603,540.

*To all whom it may concern:*

Be it known that we, REINHOLD KAAPKE and SEVEREN BELANGER, citizens of the United States, residing at Provemont, in the county of Leelanau and State of Michigan, have invented new and useful Improvements in Potato Diggers, of which the following is a specification.

This invention relates to a potato digger, the general object of the invention being to provide a plow for lifting the potatoes from the ground and a drum with a spiral therein for receiving the potatoes from the plow for separating dirt and the like from the potatoes.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side elevation of the invention.

Figure 2 is a plan view thereof.

Figure 3 is a section on line 3—3 of Figure 1.

Figure 4 is a section on line 4—4 of Figure 1.

Figure 5 is a sectional view taken on line 5—5 of Figure 3.

Figure 6 is a sectional view taken on line 6—6 of Figure 2.

Figure 7 is a sectional view taken on line 7—7 of Figure 6.

Figure 8 is a sectional view taken on line 8—8 of Figure 2.

Figure 9 is a detail view of the gears for rotating the vine pulling rollers.

Figure 10 is a sectional view taken on line 10—10 of Figure 9.

In these views 1 indicates a frame which is supported by the front and rear wheels 2, the front end of this frame converging, as at 3, where it is connected with a truck 4. A plow 5 is connected with the frame which is hinged adjacent the front end thereof and this plow is adjusted vertically by means of the lever 6 and the connections 7. A drum 8 is rotatably supported in the frame by means of the ring-shaped members 9 having diametrically disposed projections 10 thereon engaging parts of the frame and a spiral 11 is arranged in said drum so that as the same is rotated the spiral will cause the potatoes to travel from the front end to the rear end where they will be deposited into a suitable receptacle placed on the platform 12. The drum is provided with a circular rack 13 midway its ends which is engaged by a pinion 14 mounted on a shaft 15 journaled in the frame and to which is connected a sprocket 16 which is connected to a sprocket 17 by a chain 18. This sprocket 17 is connected with one of the ground wheels.

Between the sides of the diverging front end of the frame, there is a vine puller in the nature of a pair of tapered rotating rollers 19 arranged in longitudinally contacting engagement, a bracket 20 having its ends secured to the frame and which provide bearings for the rear ends of the rollers. The rollers are driven from one of the ground wheels through the medium of the gears 21 and 22 which are arranged in pairs as shown in Figure 2 of the drawings. A ring segment 24 depends from a portion of the frame and is provided at its lower ends with eyes 25 and 26 respectively which provide the bearings for the opposite ends of the rollers 19, and extending at an outward inclination from the eyes there are guide arms 27 and 28 which cooperate with each other to guide the vines of the potatoes toward the rollers so that the rollers can pull them from the ground as will be readily understood.

It will thus be seen that as the implement is drawn along a row of potatoes or the like the plow will lift the potatoes out of the ground and cause them to enter the drum where they will be engaged by the spiral therein which causes them to travel to the rear of the drum. During the passage of the potatoes through the drum dirt and the like will be separated therefrom, the dirt passing through the openings in the drum.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

A potato digger of the character described comprising a wheeled frame, a plow arranged at the front end thereof, ring shaped supporting members arranged at the respective ends of said machine, projections extending from diametrically opposite sides thereof, a drum received in the ring shaped supporting members for rotation, means for rotating said drum from the wheels of the frame, said frame having its front side walls arranged in converging relation with respect to each other, a bracket having its ends secured to the converging side walls, a pair of rotatably mounted rollers arranged for longitudinally contacting engagement and having one of the ends mounted for rotation within the bracket, means for rotatably receiving the opposite ends of said rollers and a pair of diverging arms extending from the last mentioned means as and for the purpose specified.

In testimony whereof we affix our signatures.

REINHOLD KAAPKE.
SEVEREN BELANGER.